United States Patent [19]

Savonlahti et al.

[11] Patent Number: 4,696,195
[45] Date of Patent: Sep. 29, 1987

[54] VALVE DEVICE

[75] Inventors: Jukka Savonlahti; Pertti Ekholm, both of Helsinki; Hannu Harjunmaa, Espoo, all of Finland

[73] Assignee: Labsystems Oy, Finland

[21] Appl. No.: 706,507

[22] Filed: Feb. 28, 1985

[30] Foreign Application Priority Data

Mar. 2, 1984 [FI] Finland .................................. 840846

[51] Int. Cl.$^4$ ............................................. G01N 1/10
[52] U.S. Cl. .............................. 73/864.84; 73/863.72; 422/103; 137/863; 251/331
[58] Field of Search ........... 73/863.72, 863.71, 863.73, 73/864.81, 864.82, 864.83, 864.84, 864.85, 864.86, 864.87; 251/61.1, 61.5, 331; 137/863; 422/103

[56] References Cited

U.S. PATENT DOCUMENTS

| 766,420 | 8/1904 | Calley | 137/863 X |
|---|---|---|---|
| 3,019,815 | 2/1962 | Lenardon et al. | 251/331 X |
| 3,045,702 | 7/1962 | Nakata | 73/863.72 X |
| 3,085,440 | 4/1963 | Guenther et al. | 73/863.71 |
| 3,339,582 | 9/1967 | Karas | 73/863.72 X |
| 3,368,385 | 2/1968 | Harvey, Jr. | 73/863.72 |
| 3,477,693 | 11/1969 | Bezonis | 251/331 X |
| 3,787,026 | 1/1974 | Lazar | 73/863.73 X |
| 4,304,257 | 12/1981 | Webster | 251/331 X |
| 4,537,387 | 8/1985 | Danby et al. | 251/331 |
| 4,597,412 | 7/1986 | Stark | 251/331 X |

FOREIGN PATENT DOCUMENTS 2107437 10/1971 Fed. Rep. of Germany .
2752549  6/1979 Fed. Rep. of Germany ...... 251/331

*Primary Examiner*—Tom Noland
*Attorney, Agent, or Firm*—Hopgood, Calimafde, Kalil, Blaustein & Judlowe

[57] ABSTRACT

A valve including a valve body having a surface with a plurality of orifices with a resilient closure membrane adjacent thereto is disclosed. The membrane is positioned to yield in response to a pressure differential so as to permit flow between respective ports. A male closure member is mounted to selectively urge the membrane into contact with the periphery of an orifice in order to prevent liquid flow therethrough in accordance with a desired flow arrangement. Further refinements include spring biasing of the closure mechanism, which in one construction has a movable carriage provided with a roller.

11 Claims, 1 Drawing Figure

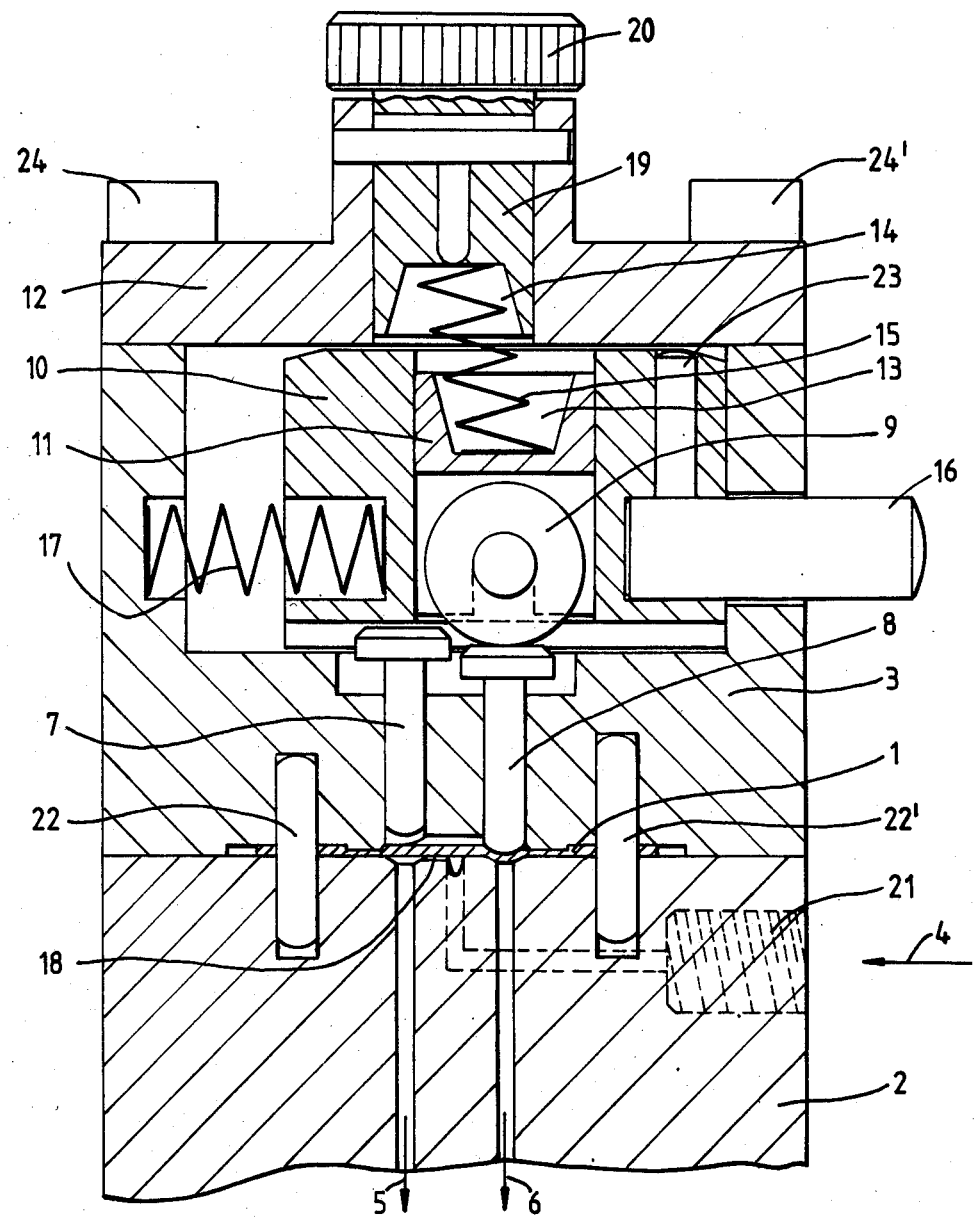

VALVE DEVICE

TECHNICAL FIELD

The present invention is concerned with a value device in particular for the dosage, mixing, or distribution of small quantities of liquid or gas. The device is used in particular for the transfer of samples or reagents in an analyzer that measures optical properties and is provided with a dosimeter.

BACKGROUND ART

From the published German Patent Application No. DE 2,107,437, a value device is known which comprises a body piece, liquid ducts opening themselves side by side at the smooth face of the body piece, as well as a resilient membrane which is pressed tightly against the face of the body piece around the openings of the ducts. The membrane is provided with a bulging facing the openings of the ducts. When the valve is to be closed, the bulging in the membrane is pressed simultaneously onto all of the openings. Thus, in this arrangement, a bulging must be prepared into the membrane in advance. It is a further drawback of the arrangement that the openings of the liquid ducts cannot be closed independently from each other.

From the published German Patent Application No. DE 2,752,549, a valve device is known in which several side ducts open themselves in a connecting channel of groove shape. The connecting channel can be closed between the openings of the side ducts by pressing a membrane by means of a pin against the walls of the connecting channel. This arrangement is not particularly suitable for apparatuses that require high precision, because a bulging of the edge of the membrane in the connecting channel may cause dosage errors.

OBJECT AND SUMMARY OF INVENTION

The object of the present invention is to provide a valve device and a method that are suitable for precise transfer of small fluid quantities in particular in an analyzer that measures optical properties.

The device in accordance with the invention comprises a body piece, ducts opening out of the piece onto its face, a sealing piece which presses a membrane tightly against the body piece outside the openings of the ducts, as well as closing means by means of which the membrane can be pressed tightly against the desired duct opening, thereby closing the orifice.

In order that the fluid could move underneath the membrane from one duct into another, the face of the body piece or of the sealing piece is provided with grooves connecting the openings. By using both of these features together, it is possible to construct particular applications, always depending on the purpose of use.

The membrane can be pressed against the mouth of each opening, for example, by means of compressed air. In particular, the closing means, however, include a pin facing each opening to be closed. By means of the pin the membrane is pressed tightly against the edges of the opening. The pins can be moved by means of a roll-shaped pressing member moving on the top of the pins, which said pressing member is controlled, e.g., by means of solenoids and springs.

BRIEF DESCRIPTION OF DRAWING

The invention will be illustrated in more detail in the following by means of the attached drawing, which is a cross-sectional view of a preferred embodiment of the invention.

DETAILED DESCRIPTION

The inventive device illustrated consists of a resilient membrane 1, which is pressed against the body piece 2 by means of a sealing piece 3. An inlet duct 4 and outlet ducts 5 and 6 open themselves through the body piece 2 underneath the membrane 1. The sealing piece 3 presses the membrane 1 tightly against the body piece 2 annularly around the ducts 4, 5 and 6. However, above the openings of the ducts 4, 5 and 6 and above the zone between the said openings, there is a recess in the sealing piece 3, which recess permits that the memberane 1 yields somewhat upwards and thereby permits movement of liquid underneath the membrane. When liquid is passed into the inlet duct 4 at a sufficient pressure, the membrane 1 yields above the opening of the ducts and the liquid moves into the outlet duct 5 or 6.

In the sealing piece 3, there are bores above the openings of the outlet ducts 5 and 6 in the body piece, into which said bores moving pins 7 and 8 have been fitted. When the pin 7 or 8 is pressed downwards against the membrane 1, the membrane is pressed against the corresponding opening and, thereby, closes the opening.

The pin 7 or 8 is pressed downwards by a roll 9. The roll 9 is mounted on a glide fork 11 located in a hole extending vertically through a carriage 10. The carriage 10 is fitted so that it glides horizontally in a recess located in the top face of the sealing piece 3, which recess is closed by a cover 12.

In the top portion of the glide fork 11, there is a shallow recess 13, and in the cover 12, there is a similar shallow recess 14. In the space formed by the recesses 13 and 14, there is a spiral spring 15, which presses the glide fork 11 downwards. Since the mouths of the recesses 13 and 14 are wider than the spring, the carriage 10 can move a sufficient distance in order to shift the roll 9 onto any one of the pins 7 or 8.

For the purpose of controlling the carriage 10, the device is provided with a control pin 16 fitted in a bore made through the sealing piece 3 into one end of the carriage and with a spiral spring 17 fitted in a bore made into the opposite end of the carriage, which said spring 17 presses the carriage against the control pin. In its basic position, the roll 9 is placed on the pin 8, from which it can be shifted onto the pin 7 by pushing the control pin 16 by means of a separate solenoid.

On the face of the body piece 2, between the opening of the inlet duct 4 and the opening of the outlet duct 5, there is a groove 18, which permits the suctioning of liquid out of the outlet duct 5 into the inlet duct 4.

The spring recess 14 in the cover 12 is placed in a separate piece 19, which is attached to a hole extending through the cover by means of a stopper 20 provided with a bayonet-socket locking. In this way, when necessary, the spring 15 can be removed easily, and the pin 8 does not attempt to deform the membrane 1 unnecessarily, e.g., during autoclave treatment.

In the FIGURE, moreover, a recess 21 for hose connection at the inlet duct 4, aligning pins 22 and 22' for correct positioning of the body part 2, the membrane 1, and of the sealing piece 3, a fastening pin 23 for attaching the control pin 16 to the carriage 11, as well as bolts 24 and 24' for connecting the body piece 2, the sealing piece 3, and the cover 12 together, are seen.

The device may be constructed of conventional plastic and steel materials. If the device must be autoclaved when it is used, of course, it is to be taken into account that the components must tolerate the required temperature (e.g. 120° C.). The body piece 2, the sealing piece 3, and the cover 12 are made, e.g., of polycarbonate plastic, the membrane 1, e.g., of silicon rubber, and the carriage 10, e.g., of teflon plastic.

The diameter of the device shown in the FIGURE is about 50 mm, and the diameter of the ducts 4, 5 and 6 about 1 mm.

The device in accordance with the FIGURE is intended in particular for precise and automatic dilution of liquid samples in an analyzer that measures optical properties. In such a case, a hose, together with a bi-directional tubing pump associated with the hose, is connected to the duct 4. The mouth of the duct 6 opens inside the duct 5, i.e., duct 6 intersects and empties into duct 5, and the duct 6 is additionally provided with a side duct and a piston in the said side duct. The operation is started by sucking the diluent up through the duct 5 and through groove 18 into the duct 4. Thereupon, the opening of the duct 5 is closed by means of the pin 7, and concomitantly duct 6 is opened and diluent now in duct 4 is pumped by the tubing pump into the duct 6. The opening of the duct 6 is allowed to be closed again, duct 5 simultaneously opening, and the sample is sucked through the joint tip of the ducts 5 and 6, i.e., via duct 5 to the intersection with 6, into the duct 6 by means of the piston disposed in its side duct. When diluent is now pumped out of the duct 4 and, at the same time, sample is pumped out of the duct 6 by means of the tubing pump and piston, respectively, into the duct 5, a diluted sample is obtained, whose ratio of dilution depends on the rates of pumping that are chosen.

In the embodiment shown in the FIGURE, the face of the body piece 2 underneath the membrane 1 is planar. It may also be made, e.g., as a concave or convex spherical or cylindrical face. If the face is convex, it is possible to place several solenoid-controlled closing pins of the ducts directed at a very small area. On the other hand, if the face is concave, it is possible to control several pins placed perpendicularly to the face by means of a single member placed at extensions of the upper ends of the pins, e.g. by means of a cam disc.

What is claimed is:

1. A valve device suitable for transferring small and precise quantities of fluid comprising: a valve body defining a valve surface with a plurality of valve orifices within a valve area; a support body coupled to said valve body defining a support surface in facing relationship with said valve surface said support surface having a recess opposite said valve area; a resilient membrane secured between said support surface and said valve surface along a region encircling said orifices, said membrane being positioned, configured and dimensioned to yield so as to allow fluid transfer between said orifices in response to a pressure differential across said membrane; a pair of male closure members corresponding to at least two of said plurality of orifices slidingly mounted on means for supporting said closure members, each of said closure members being positioned facing and in alignment with said orifices on the opposite side of said membrane from said orifices and having an end configured to urge said membrane into contact with the respective peripheral edges of said orifices upon advancement theretoward, whereby said orifices are securely closed; and means coupled to said closure member for selectively advancing said closure members towards said orifices, at least two of said orifices being directly interconnected by a groove in said valve surface.

2. The valve device according to claim 1, wherein said means for selectively advancing said closure members comprises in combination a spring coupled to a pressing member for biasing said pressing member against one of said closure members so as to advance said closure member towards said membrane thereby closing said orifice and means for positioning said pressing member so that it contacts only one of said closure members.

3. The valve device according to claim 2, wherein said pressing member comprises a roller mounted on a carriage, said carriage being displaceable in a direction substantially parallel to said membrane and including means for slidingly supporting said roller allowing for displacement of said roller in a direction substantially perpendicular to said membrane.

4. The valve device according to claim 3, wherein an end of said spring is affixed to said support body.

5. The valve device according to claim 4, further comprising a second spring coupled to said carriage for biasing said carriage towards a rest position.

6. The valve device according to claim 5, wherein said valve surface is substantially planar.

7. In a system for passing fluids between ducts in an optical analyzer provided with a liquid dosimeter, a method of accurately directing fluid transfer within a single valve comprising the steps of: providing fluid under pressure to a duct coupled to a valve device comprising a valve body defining a valve surface with a plurality of valve orifices, a support body coupled to said valve body defining a support surface in facing relationship with said valve surface, a resilient membrane secured between said support surface and said valve surface about said orifices, said membrane being positioned, configured and dimensioned to yield so as to allow fluid transfer between said orifices in response to a pressure differential across said membrane, at least one male closure member corresponding to one of said plurality of orifices slidingly mounted on means for supporting said closure member, said closure member being positioned facing and in alignment with said at least one orifice on the opposite side of said membrane from said orifices and having an end configured to urge said membrane into contact with the peripheral edge of said at least one orifice upon advancement theretoward, and means for advancing said closure member towards said orifice coupled to said closure member, said duct being coupled to said at least one orifice, so that pressurized fluid may flow between said orifices underneath said membrane; at least two of said orifices being directly interconnected by a groove in said valve surface; and controlling the flow of fluid between said orifices by advancing said closure member towards said at least one orifice thereby pressing the membrane about its peripheral edge and closing said at least one orifice.

8. A valve device suitable for transferring small and precise quantities of fluid comprising: a valve body defining a valve surface with a plurality of valve orifices therein; said valve body containing respective ducts communicating with said orifices; a support body coupled to said valve body defining a support surface in facing relationship to said valve surface; a resilient membrane secured between said support surface and said valve surface along a region encircling said orifices, said membrane being positioned, configured and dimensioned to yield so as to allow fluid transfer between said orifices in response to a pressure differential across said membrane; at least one male closure member corresponding to at least one of said plurality of orifices slidingly mounted on means for supporting said closure member, said closure member being positioned facing and in alignment with said at least one orifice on the opposite side of said membrane from said orifice and having an end configured to urge said membrane into contact with the peripheral edge of said at least one orifice upon advancement theretoward, whereby said orifice is securely closed; and means coupled to said closure member for advancing said closure member towards said orifice, at least two of said orifices being directly interconnected by a groove in said valve surface.

9. The valve device according to claim 8, wherein said means for advancing said closure member comprises a pressing member coupled to means for biasing said pressing member against said closure member so as to advance said closure member towards said membrane thereby closing said orifice.

10. A valve device according to claim 8, wherein said plurality of valve orifices are positioned within a valve area of said valve surface and said resilient membrane is annularly secured between said valve surface and said support surface with respect to said valve area and said support body defines a cavity opposite said valve area for allowing displacement of said membrane from said valve surface.

11. The valve device according to claim 10, wherein said peripheral edge of said at least one orifice has an inclined surface, and said end of said closure member has an inclined end adapted to mate with said inclined surface.

* * * * *